United States Patent
Kametani et al.

(10) Patent No.: US 8,830,403 B1
(45) Date of Patent: Sep. 9, 2014

(54) IMAGE PROCESSING DEVICE AND IMAGE PROCESSING METHOD

(71) Applicant: Sony Corporation, Tokyo (JP)

(72) Inventors: Satoshi Kametani, Tokyo (JP); Nobuyuki Asakura, Tokyo (JP); Junya Kameyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/197,243

(22) Filed: Mar. 5, 2014

(30) Foreign Application Priority Data

Mar. 15, 2013 (JP) ................................. 2013-052600

(51) Int. Cl.
*H04N 11/20* (2006.01)
*H04N 9/64* (2006.01)
*H04N 5/50* (2006.01)

(52) U.S. Cl.
USPC ............................ 348/716; 348/441; 348/569

(58) Field of Classification Search
USPC ........... 348/441, 458, 569, 584, 714–71, 718, 348/598, 600; 345/544–547, 563, 574; 386/232
See application file for complete search history.

(56) References Cited

U.S. PATENT DOCUMENTS

| | | | | |
|---|---|---|---|---|
| 6,034,733 | A * | 3/2000 | Balram et al. | 348/448 |
| 6,175,386 | B1 * | 1/2001 | Van De Schaar-Mitrea et al. | 348/563 |
| 8,421,921 | B1 * | 4/2013 | Woodall | 348/569 |
| 8,421,922 | B2 * | 4/2013 | Hoshino | 348/569 |
| 2004/0085480 | A1 * | 5/2004 | Salzer et al. | 348/584 |
| 2007/0265098 | A1 * | 11/2007 | Shimada et al. | 463/43 |
| 2008/0028431 | A1 * | 1/2008 | Park | 725/90 |
| 2008/0181312 | A1 * | 7/2008 | Kimura | 375/240.27 |
| 2008/0211968 | A1 * | 9/2008 | Murakami et al. | 348/699 |
| 2009/0059074 | A1 * | 3/2009 | Suematsu et al. | 348/569 |
| 2009/0207183 | A1 * | 8/2009 | Matsuura | 345/606 |
| 2010/0091186 | A1 * | 4/2010 | Takata | 348/452 |
| 2010/0178038 | A1 * | 7/2010 | Ju | 386/109 |

FOREIGN PATENT DOCUMENTS

JP 2013-017014 1/2013

* cited by examiner

*Primary Examiner* — Victor Kostak
(74) *Attorney, Agent, or Firm* — Wolf, Greenfield & Sacks, P.C.

(57) ABSTRACT

An image processing device includes: a control section configured to allow, upon receipt of a moving image that includes, in time-series order, an original image and a duplicate image, a frame memory to hold a partial region in the original image and a remaining region in the duplicate image, in which the duplicate image is a duplicate of the original image, and the remaining region is a region excluding a region that agrees with the partial region; and an image processing section configured to read a piece of data that includes the partial region and the remaining region from the frame memory a plurality of times, and perform image processing by processing any of the read pieces of data as the original image and the remaining piece of data as the duplicate image.

10 Claims, 17 Drawing Sheets

IMAGE PROCESSING DEVICE AND IMAGE PROCESSING METHOD

CROSS REFERENCE TO RELATED APPLICATIONS

This application claims the benefit of Japanese Priority Patent Application JP2013-52600 filed Mar. 15, 2013, the entire contents of which are incorporated herein by reference.

BACKGROUND

The present technology relates to an image processing device and an image processing method. Specifically, the present technology relates to an image processing device and an image processing method in which a moving image after frame rate conversion is processed.

In a currently-available image processing device such as a television receiver, frame rate conversion of changing the number of frames per unit time (i.e. a frame rate) in a moving image may be performed. For example, the frame rate conversion of increasing the frame rate may be performed in smoothing a motion of an object in a moving image.

In this frame rate conversion, there is often used a frame interpolation method in which an interpolated frame is newly generated from an original frame, and the generated interpolated frame is inserted between original frames. In this frame interpolation method, for a moving image with a large motion, there is used a method in which a motion of an object is detected, an interpolated frame is generated based on a result of the detection, and the generated interpolated frame is inserted. On the other hand, for a moving image with a small motion, such as a moving image including an OSD (On Screen Display) image, there is used a method in which an image obtained by duplicating the original frame is directly inserted as an interpolated frame.

There has been proposed an image processing device in which a moving image with a frame rate converted by the above-described frame interpolation method is temporarily held on a frame basis in a buffer such as a frame memory, and image processing is performed by reading each of the held frames (for example, see Japanese Unexamined Patent Application Publication No. 2013-17014).

SUMMARY

In the above-described existing technique, it may be difficult to perform the image processing when the frame rate and a frame resolution are increased. With the increases in the frame rate and an image resolution, the amount of data per unit time increases, which makes a data transfer rate of an implemented interface insufficient. Therefore, it may be difficult to transfer the frame to the frame memory in real time. Further, the increase in the amount of data per unit time increases the frequency of access to the frame memory and the amount of transfer data in one access. Therefore, power consumption of the frame memory and a memory controller that accesses the frame memory may increase.

It is desirable to reduce the amount of data transfer per unit time to a frame memory.

According to an embodiment of the present technology, there is provided an image processing device including: a control section configured to allow, upon receipt of a moving image that includes, in time-series order, an original image and a duplicate image, a frame memory to hold a partial region in the original image and a remaining region in the duplicate image, the duplicate image being a duplicate of the original image, and the remaining region being a region excluding a region that agrees with the partial region; and an image processing section configured to read a piece of data that includes the partial region and the remaining region from the frame memory a plurality of times, and perform image processing by processing any of the read pieces of data as the original image and the remaining piece of data as the duplicate image. This provides a function of allowing the frame memory to hold the partial region in the original image and the remaining region in the duplicate image, and reading the data thereof from the frame memory the plurality of times.

According to an embodiment of the present technology, there is provided an image processing method including: allowing, upon receipt of a moving image that includes, in time-series order, an original image and a duplicate image, by a control section a frame memory to hold a partial region in the original image and a remaining region in the duplicate image, the duplicate image being a duplicate of the original image, and the remaining region being a region excluding a region that agrees with the partial region; and reading, by an image processing section, a piece of data that includes the partial region and the remaining region from the frame memory a plurality of times, and performing, by the image processing section, image processing by processing any of the read pieces of data as the original image and the remaining piece of data as the duplicate image. This provides a function of allowing the frame memory to hold the partial region in the original image and the remaining region in the duplicate image, and reading the data thereof from the frame memory the plurality of times.

Advantageously, the moving image may include a plurality of the duplicate images that are successive in the time-series order, and the control section may allow the frame memory to hold the remaining region in any of the plurality of successive duplicate images. This provides a function of allowing the frame memory to hold the remaining region in any of the plurality of successive duplicate images.

Advantageously, each of the original image and the duplicate image may be an image including a plurality of pieces of transfer-unit data, and the control section may include: a buffer configured to hold data; a writing control section configured to divide, each time the writing control section receives any of the pieces of transfer-unit data in the original image, the received piece of transfer-unit data into two pieces of divisional data, and allow the buffer to hold one of the two pieces of divisional data, and configured to divide, each time the writing control section receives any of the pieces of transfer-unit data in the duplicate image, the received piece of transfer-unit data into the two pieces of divisional data, and allow the buffer to hold the other of the two pieces of divisional data; and a reading control section configured to read, each time either of the two pieces of divisional data is held in the buffer, the held piece of divisional data, and allow the frame memory to hold the read piece of divisional data. This provides such a function that each of the pieces of transfer-unit data in the original image is divided into two, and the one of the two is held in the frame memory, and that each of the pieces of transfer-unit data in the duplicate image is divided into the two, and the other of the two is held in the frame memory.

Advantageously, each of the pieces of transfer-unit data may be line data that includes pixels arranged in a line in a predetermined direction. This provides a function of dividing the line data into the two pieces of divisional data.

Advantageously, each of the pieces of transfer-unit data may be pixel data. This provides a function of dividing the pixel data into the two pieces of divisional data.

Advantageously, each of the two pieces of divisional data may have a data size that is equal to or less than a burst access size of the frame memory. This provides such a function that burst transfer of each of the two pieces of divisional data is performed.

Advantageously, a duplication section may be further included that is configured to generate the duplicate image from the original image, and supply the original image and the duplicate image to the control section in the time-series order. This provides a function of generating the duplicate image from the original image.

Advantageously, the duplication section may generate a flag indicating whether or not an image in the moving image is the original image, and may supply the generated flag together with the original image and the duplicate image to the control section, and the control section may determine whether or not the image in the moving image is the original image, based on the supplied flag. This provides a function of determining whether or not the image in the moving image is the original image, based on the flag.

Advantageously, each of the original image and the duplicate image may be a supplemental image to be combined with a main image, and the image processing may include processing of combining each of the original image and the duplicate image with the main image. This provides a function of combining each of the original image and the duplicate image with the main image.

According to the above-described embodiments of the present technology, an outstanding effect of reducing the amount of data transfer per unit time to the frame memory is achievable.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to describe the principles of the technology.

DETAILED DESCRIPTION

Some embodiments of the present technology will be described below. The description will be provided in the following order.
1. First embodiment (an example of allowing a frame memory to hold a left half of an original image and a right half of an interpolated image)
2. Second embodiment (an example of allowing a frame memory to hold a left half of an original image and a right half of an interpolated image in a moving image on which 2-3 pull down is performed)

1. First Embodiment

[Configuration Example of Image Processing System]

Figure 1:
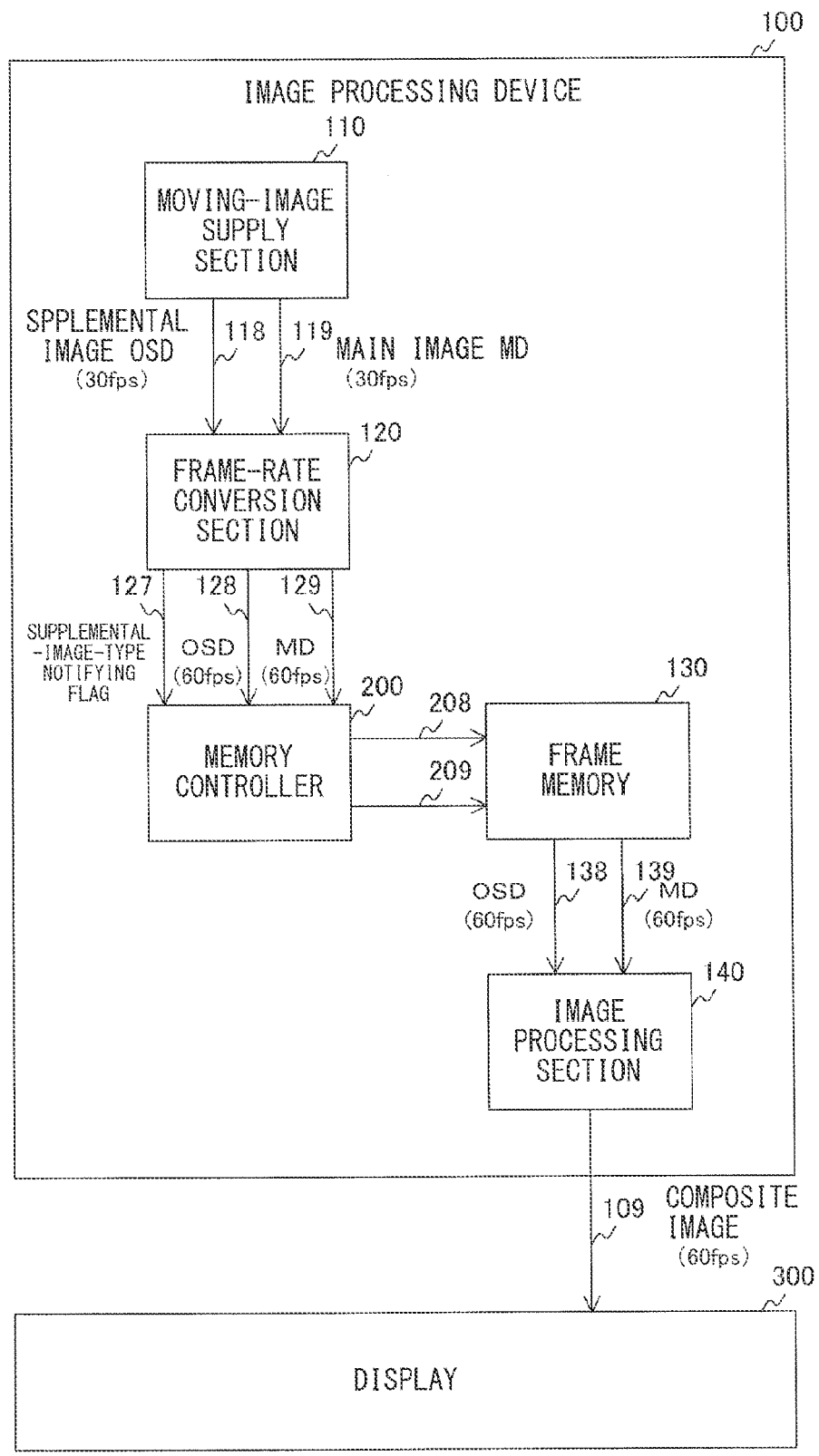
FIG. 1 is block diagram illustrating a configuration example of an image processing system in a first embodiment.

FIG. 1 is a block diagram illustrating a configuration example of an image processing system in a first embodiment. This image processing system is a system in which a moving image including a plurality of images in time-series order is processed and displayed. This image processing system may be, for example, a television receiver. The image processing system includes an image processing device 100 and a display 300.

The image processing device 100 is a device in which a moving image including a plurality of images in time-series order is processed. The image processing device 100 may be, for example, a device such as a terrestrial digital tuner and a video recorder in a television receiver. The image processing device 100 includes a moving-image supply section 110, a frame-rate conversion section 120, a memory controller 200, a frame memory 130, and an image processing section 140.

The moving-image supply section 110 acquires a moving image and supplies the acquired moving image. The moving-image supply section 110 acquires the moving image from a recording device such as a HDD (Hard Disk Drive). This moving image includes a plurality of main images MD (frames) in time-series order. It is to be noted that the moving-image supply section 110 may acquire a moving image carried on a broadcast wave, by receiving the broadcast wave and decoding the received broadcast wave.

Further, the moving-image supply section 110 generates a plurality of supplemental images OSD in accordance with operation of a user, and supplies the generated supplemental images OSD as a moving image in time-series order. Here, the supplemental image OSD is an image (a frame) to be combined with the main image MD, and may be displayed, for example, by an on-screen display function of the image processing device 100.

The moving-image supply section 110 supplies each of the supplemental images OSD to the frame-rate conversion section 120 through a signal line 118, and supplies each of the main images MD to the frame-rate conversion section 120 through a signal line 119. The moving image including the main images MD and the moving image including the supplemental images OSD may each have a frame rate of, for example, 30 fps (frames per second). It is to be noted that the frame rate of each of these moving images may be any of frame rates other than 30 fps, such as 24 fps and 60 fps.

The frame-rate conversion section 120 performs conversion of the frame rate of the moving image to a value higher than that before the conversion. The conversion in the frame-rate conversion section 120 may be, for example, conversion of doubling the frame rate. Such conversion is called double-speed conversion. When a frame rate before the conversion is 30 fps, the frame rate becomes 60 fps after the conversion, by the double-speed conversion. The frame-rate conversion section 120 converts the frame rate, by interpolating an image obtained by duplicating the supplemental image OSD, in the moving image including the supplemental images OSD. In the following, the supplemental image OSD that has been duplicated will be referred to as "original supplemental image", and the supplemental image that has been interpolated will be referred to as "interpolated supplemental image". Further, for each of the supplemental images OSD, the frame-rate conversion section 120 generates a supplemental-image-type notifying flag that indicates whether or not the supplemental image OSD is the original supplemental image.

On the other hand, the frame-rate conversion section 120 detects a motion in the moving image including the main images MD, and performs motion compensation of predicting and interpolating an image between the main images MD next to each other, based on a result of the detection, thereby converting the frame rate. In the following, the main image MD, which is the original, will be referred to as "original main image", and the main image MD that has been interpolated will be referred to as "interpolated main image".

The frame-rate conversion section 120 supplies the generated supplemental-image-type notifying flag to the memory controller 200 through a signal line 127, and supplies the supplemental image OSD after the frame rate conversion to the memory controller 200 through a signal line 128. Further, the frame-rate conversion section 120 supplies the main image MD after the frame rate conversion to the memory controller 200 through a signal line 129.

Here, the main image MD and the supplemental image OSD may be, for example, transferred from the frame-rate conversion section 120 to the memory controller 200 through an interface compliant with a V-by-One standard. On the other hand, the supplemental-image-type notifying flag may be, for example, transferred through a CMOS (Complementary Metal Oxide Semiconductor) interface.

It is to be noted that the frame-rate conversion section 120 may transfer the main image MD and the supplemental image OSD in accordance with a HDMI (High-Definition Multimedia Interface) standard, and transfer the supplemental-image-type notifying flag by defining an original packet in the HDMI standard. When the HDMI standard is used, it is possible to transfer each piece of data through a single HDMI cable, in place of the two signal lines 128 and 129. In this case, the supplemental-image-type notifying flag is superimposed in a packet format, and may be, for example, transferred during a vertical blanking period or a horizontal blanking period.

Further, the frame-rate conversion section 120 may transfer the supplemental-image-type notifying flag a through 12C (Inter Integrated Circuit) interface, instead of through the CMOS interface.

The memory controller 200 allows the frame memory 130 to hold an image. Upon receipt of the supplemental image OSD and the supplemental-image-type notifying flag, the memory controller 200 determines whether or not the supplemental image OSD is the original supplemental image, based on the supplemental-image-type notifying flag.

When the supplemental image OSD is the original supplemental image, the memory controller 200 transfers a region A that is a part (for example, a left half) of the original supplemental image to the frame memory 130 through a signal line 209. The transferred region A is then held in the frame memory 130. On the other hand, when the supplemental image OSD is the interpolated supplemental image, the memory controller 200 transfers a region B in this interpolated supplemental image to the frame memory 130 through the signal line 209. The region B is a part (for example, a right half) excluding a region agreeing with the region A. The transferred region B is then held in the frame memory 130. The interpolated supplemental image is an image obtained by duplicating the original supplemental image. Therefore, the image including the regions A and B held in the frame memory 130 is an image identical with the original supplemental image (or the interpolated supplemental image).

On the other hand, the memory controller 200 transfers each of the main images MD to the frame memory 130 through a signal line 208, and the transferred main image MD is held in the frame memory 130. It is to be noted that the memory controller 200 is a specific but not limitative example of "control section" in one embodiment of the present technology.

The frame memory 130 is provided to hold the main image MD and the supplemental image OSD.

The image processing section 140 is provided to process an image read from the frame memory 130. Specifically, each time the supplemental image OSD (the regions A and B) is held in the frame memory 130, the image processing section 140 reads the supplemental image OSD in synchronization with a vertical synchronizing signal a plurality of times. The vertical synchronizing signal will be described later. The number of reading times is determined based on a ratio between the frame rate before the conversion and that after the conversion. For example, the supplemental image OSD may be read twice in the double-speed conversion, and read four times in quad-speed conversion. By the image processing section 140, any of the supplemental images OSD that have been read the plurality of times is processed as the original supplemental image, and the remaining supplemental image OSD is processed as the interpolated supplemental image. In this way, the image processing section 140 reads the image the plurality of times, and thereby the moving image of the frame rate after the conversion is obtained.

On the other hand, each time the main image MD is held in the frame memory 130, the image processing section 140 reads the main image MD once. The image processing section 140 then performs various kinds of image processing on the read main image MD and the read supplemental image OSD. The image processing to be performed includes processing of generating a composite image by combining the main image MD and the supplemental image OSD. In addition, noise reduction processing, white balance processing, gamma correction processing, and the like may be performed as necessary. These kinds of image processing may be performed in any order. The image processing section 140 outputs the composite image after the processing, to the display 300 through a signal line 109.

The display 300 displays the composite image, and may be, for example, a display such as a liquid crystal display.

It is to be noted that the moving-image supply section 110 supplies both the supplemental image OSD and the main image MD, but may supply only the supplemental image OSD. In this case, the frame-rate conversion section 120 converts only the moving image including the supplemental images OSD. Moreover, the memory controller 200 allows the frame memory 130 to hold only the supplemental image OSD, and the image processing section 140 processes only the supplemental image OSD.

Further, the image processing device 100 divides the supplemental image OSD into the regions A and B which are then held in the frame memory 130. However, the image processing device 100 may divide a moving image other than the supplemental image OSD into the regions A and B which are then held in the frame memory 130, if this moving image is an image whose frame rate has been converted by interpolation using an image obtained by duplicating the original image.

Furthermore, the memory controller 200 allows the one frame memory 130 to hold both the main image MD and the supplemental image OSD, but the present embodiment is not limited to this configuration. For example, the image processing device 100 may include two frame memories, and allow one of these to hold the main image MD and the other to hold the supplemental image OSD.

[Configuration Example of Frame-Rate Conversion Section]

Figure 2:
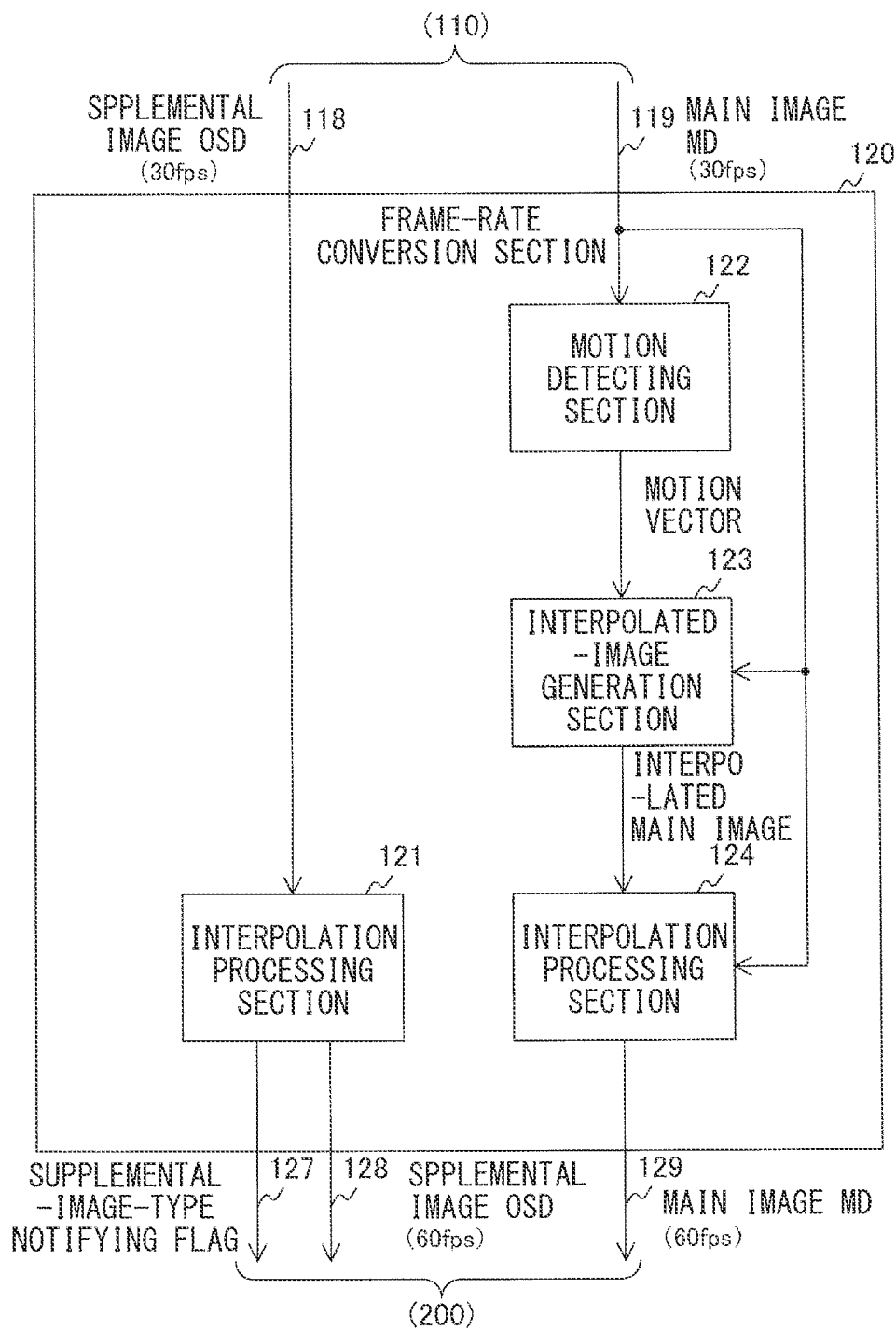
FIG. 2 is a block diagram illustrating a configuration example of a frame-rate conversion section in the first embodiment.

FIG. 2 is a block diagram illustrating a configuration example of the frame-rate conversion section 120 in the first embodiment. The frame-rate conversion section 120 includes interpolation processing sections 121 and 124, a motion detecting section 122, and an interpolated-image generation section 123.

The interpolation processing section 121 is provided to perform interpolation using the image obtained by duplicating the original supplemental image, as the interpolated supplemental image. The interpolation processing section 121 supplies the original supplemental image and the interpolated supplemental image to the memory controller 200 in time-series order. Further, the interpolation processing section 121 generates the supplemental-image-type notifying flag for each of the supplemental images OSD, and supplies the generated supplemental-image-type notifying flag to the memory controller 200. For example, a value of "1" may be set to the supplemental-image-type notifying flag when the supplemental image OSD is the original supplemental image, and a value of "0" may be otherwise set to the supplemental-image-type notifying flag.

The motion detecting section 122 is provided to detect a motion of an object in the main image MD. For example, the motion detecting section 122 may partition the main image MD into a plurality of blocks each having a predetermined shape, and detect a vector, which indicates a direction and a distance in which the blocks move within a fixed period of time, as a motion vector. For example, in the motion detection, the main image MD may be treated as an image including square blocks each formed of 8×8 pixels. The motion detecting section 122 determines two blocks with a high correlation in the two main images MD next to each other, by using block matching or the like. The motion detecting section 122 then detects a vector from one of these blocks to the other as the motion vector, and supplies the interpolated-image generation section 123 with the detected vector.

The interpolated-image generation section 123 is provided to generate the interpolated image based on the motion vector. For example, the interpolated-image generation section 123 may generate a motion compensation image by moving, along the motion vector, pixels of one of the two main images MD next to each other, and may further generate a motion compensation image by moving pixels of the other along the motion vector. The interpolated-image generation section 123 then generates an interpolated main image by combining these motion compensation images. The interpolated-image generation section 123 supplies the interpolated main image to the interpolation processing section 124.

The interpolation processing section 124 is provided to interpolate the interpolated main image supplied from the interpolated-image generation section 123, between the two original main images next to each other. The interpolation processing section 124 supplies the original main image and the interpolated main image to the memory controller 200 in time-series order.

Figure 3A:
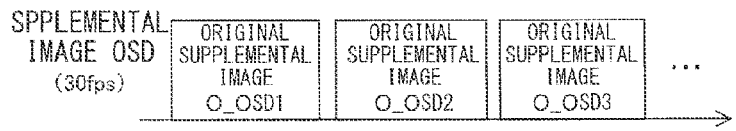
FIGS. 3A to 3D are diagrams each illustrating an example of either a moving image before frame rate conversion or a moving image after the frame rate conversion, in the first embodiment.

FIGS. 3A to 3D are diagrams each illustrating an example of either the moving image before the frame rate conversion or the moving image after the frame rate conversion, in the first embodiment. FIG. 3A is a diagram illustrating an example of the moving image including the supplemental image OSD before the frame rate conversion. This moving image includes the plurality of supplemental images OSD such as original supplemental images O_OSD1, O_OSD2, and O_OSD3, in time-series order.

Figure 3B:
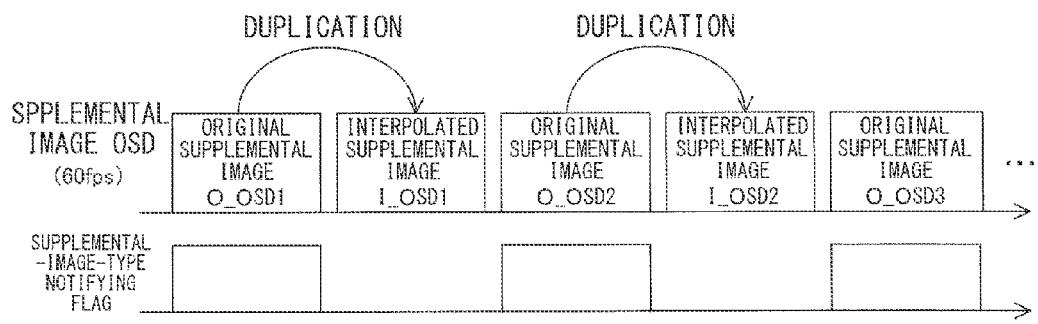

FIG. 3B is a diagram illustrating an example of each of the moving image including the supplemental image OSD, and the supplemental-image-type notifying flag, after the frame rate conversion. In this moving image, an image obtained by duplicating the original supplemental image is inserted as the interpolated supplemental image. For example, an image obtained by duplicating the original supplemental image O_OSD1 may be interpolated between the original supplemental image O_OSD1 and the original supplemental image O_OSD2, as an interpolated supplemental image I_OSD1. Further, an image obtained by duplicating the original supplemental image O_OSD2 is interpolated between the original supplemental image O_OSD2 and the original supplemental image O_OSD3, as an interpolated supplemental image I_OSD2.

Figure 3C:

FIG. 3C is a diagram illustrating an example of the moving image including the main image MD before the frame rate conversion. This moving image includes the plurality of main images MD such as original main images O_MD1, O_MD2, and O_MD3, in time-series order.

Figure 3D:
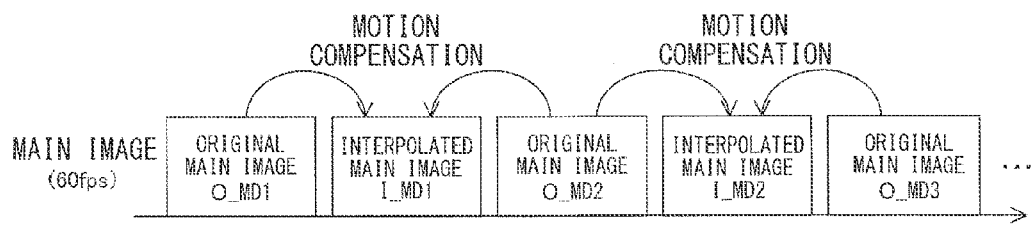

FIG. 3D is a diagram illustrating an example of the moving image including the main image MD after the frame rate conversion. In this moving image, the interpolated supplemental image generated from the original main images next to each other is inserted. For example, an image generated from the original main images O_MD1 and O_MD2 by the motion compensation may be interpolated between the original main images O_MD1 and the original main image O_MD2, as an interpolated main image I_MD1. Further, for example, an image generated from the original main images O_MD2 and O_MD3 by the motion compensation may be interpolated between the original main image O_MD2 and the original main image O_MD3, as an interpolated main image I_MD2.

Figure 4:
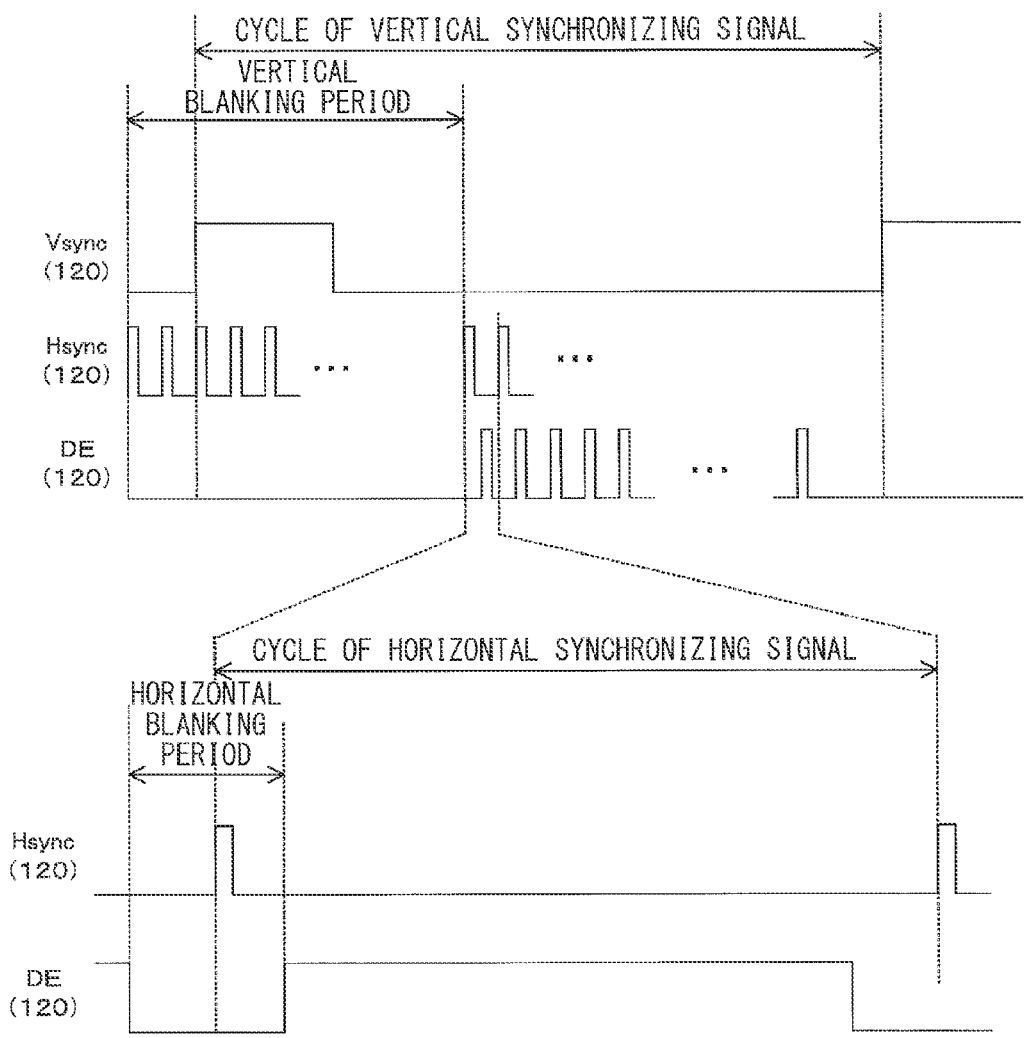
FIG. 4 is a diagram illustrating an example of a timing signal in the first embodiment.

FIG. 4 is a diagram illustrating an example of a timing signal in the first embodiment. In addition to the plurality of images (the main images MD or the supplemental images OSD), the timing signal is included in the moving image supplied from the moving-image supply section 110. This timing signal includes a synchronization signal and a data enable signal DE. The data enable signal DE is a signal indicating a period during which pixel data is valid. The synchronization signal includes a vertical synchronizing signal Vsync indicating scanning timing in a vertical direction and a horizontal synchronizing signal Hsync indicating scanning timing in a horizontal direction. Each of the images is transferred in synchronization with the vertical synchronizing signal Vsync. Here, the data enable signal DE is set at a high level (asserted) in a period during which the pixel data in a line is valid, and set at a low level (negated) in the horizontal blanking period during which the pixel data in the line is invalid. In other words, a period from a fall in the data enable signal DE to a rise in the next data enable signal DE is equivalent to the horizontal blanking period. Further, the data enable signal DE is asserted for each line in a period during which the pixel data in the image is valid, and negated in the vertical blanking period during which the pixel data in the image is invalid. In other words, a period from completion of assertion of the data enable signal DE for each line to beginning of assertion of the data enable signal DE for each line in the next image is equivalent to the perpendicular blanking period.

Here, each of the supplemental image OSD to be transferred and the main image MD to be transferred is an image including a plurality of pixels arranged in a two-dimensional grid. In each of these images, the plurality of pixels arranged in a line in a predetermined direction (for example, a horizontal direction) is called a line. Data of each line (hereinafter referred to as "line data") is transferred in synchronization with the horizontal synchronizing signal Hsync, in the period during which the data enable signal DE is at the high level.

[Configuration Example of Memory Controller]

Figure 5:
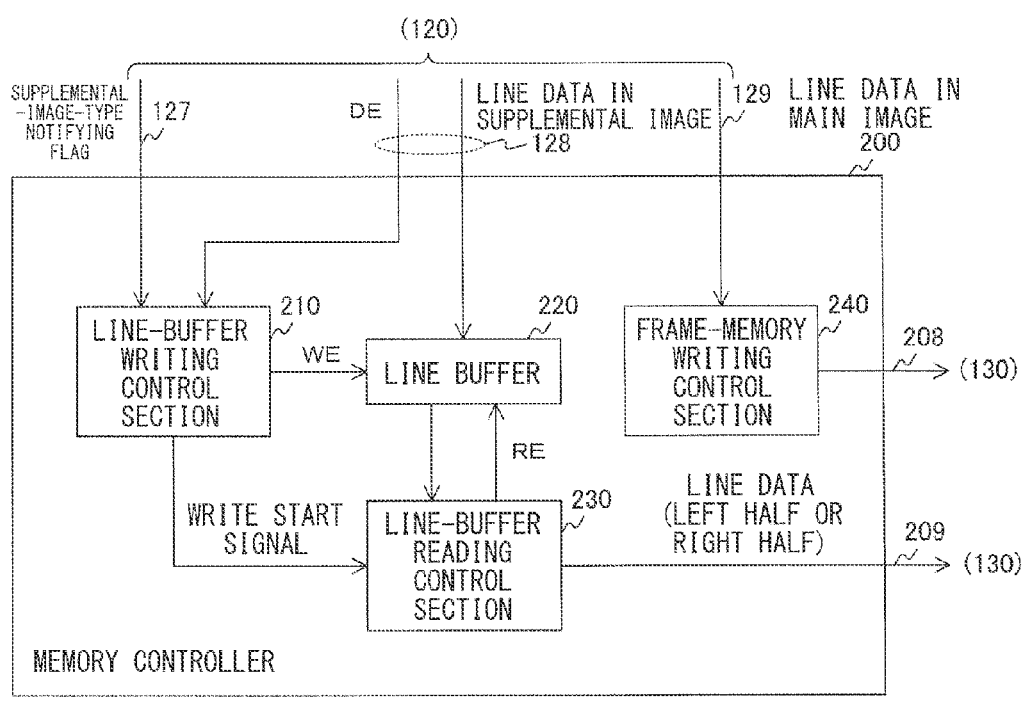
FIG. 5 is a block diagram illustrating a configuration example of a memory controller in the first embodiment.

FIG. 5 is a block diagram illustrating a configuration example of the memory controller 200 in the first embodiment. The memory controller 200 includes a line-buffer writing control section 210, a line buffer 220, a line-buffer reading control section 230, and a frame-memory writing control section 240.

The line-buffer writing control section 210 is provided to control writing of data to the line buffer 220 based on a write enable signal WE. Here, the write enable signal WE is a signal used to control the writing of data to the line buffer 220. For example, a high level may be set at the write enable signal WE when enabling the writing of data to the line buffer 220, and a low level may be set when disabling the same.

The line-buffer writing control section 210 receives the supplemental-image-type notifying flag and the data enable signal DE from the frame-rate conversion section 120. The line-buffer writing control section 210 then determines whether the supplemental image OSD is the original supplemental image or the interpolated supplemental image, based on the supplemental-image-type notifying flag.

When the supplemental image OSD is the original supplemental image, the line-buffer writing control section 210 generates a write start signal at timing of a rise in the data enable signal DE, and supplies the generated write start signal to the line-buffer reading control section 230. The write start signal indicates timing of starting the writing of data to the line buffer 220. In addition, the line-buffer writing control section 210 generates the write enable signal WE set at the high level, over a period from the timing of the generation of the write start signal up to elapse of a fixed time T. Here, the fixed time T is a time necessary to complete the transfer of the pixel data for a half line of the supplemental image OSD from the frame-rate conversion section 120 to the line buffer 220. This allows the left half of each line of the supplemental image OSD to be written in the line buffer 220.

On the other hand, when the supplemental image OSD is the interpolated supplemental image, the line-buffer writing control section 210 generates the write start signal and supplies the generated write start signal to the line-buffer reading control section 230, after a lapse of the fixed time T from a rise in the data enable signal DE. In addition, the line-buffer writing control section 210 generates the write enable signal WE set at the high level, over a period from the timing of the generation of the write start signal up to elapse of the fixed time T. This allows the right half of each line of the supplemental image OSD to be written in the line buffer 220.

The line buffer 220 is provided to hold the data of the right half or the left half of each line of the supplemental image OSD.

The line-buffer reading control section 230 is provided to read the data from the line buffer 220, by controlling the line buffer 220 based on a read enable signal RE. Here, the read enable signal RE is a signal used to control reading of data from the line buffer 220. For example, a high level may be set at the read enable signal RE (asserted) when reading one piece of pixel data from the line buffer 220, and a low level may otherwise be set (negated).

Upon receipt of the write start signal from the line-buffer writing control section 210, the line-buffer reading control section 230 starts generating the read enable signal RE. The line-buffer reading control section 230 asserts the read enable signal RE the number of times same as the number of pixels in the half line. This allows the data for the half line to be read. The line-buffer reading control section 230 transfers the read data to the frame memory 130. Here, the data (the data for the half line) held in the line buffer 220 is assumed to have a data size equal to or less than a burst access size of the frame memory 130. Therefore, the line-buffer reading control section 230 is allowed to transfer the data for the half line to the frame memory 130 at high speed, by burst transfer.

The frame-memory writing control section 240 is provided to write each line in the main image MD, sequentially in the frame memory 130.

It is to be noted that the line-buffer writing control section 210 allows the left half of the line of the original supplemental image and the right half of the line of the interpolated supplemental image to be held, but may allow the right half of the line of the original supplemental image and the left half of the line of the interpolated supplemental image to be held, conversely.

In addition, the line-buffer writing control section 210 divides the line data of each line of the supplemental image OSD, and allows the left half or the right half thereof to be held, but may divide data other than the line data. For example, the line-buffer writing control section 210 may divide a region that has certain area and includes a plurality of lines in the supplemental image OSD, and allow a left half or a right half of thereof to be held. In this case, each time a plurality of pieces of line data are transferred from the frame-rate conversion section 120, the line-buffer writing control section 210 allows the buffer to hold the left half or the right half of the region including these pieces of line data.

Alternatively, the line-buffer writing control section 210 may divide a certain region including a plurality of pixels in the supplemental image OSD, and allow a left half or a right half thereof to be held. In this case, each time the plurality of pixels (for example, ten pixels) are transferred from the frame-rate conversion section 120, the line-buffer writing control section 210 allows the buffer to hold the left half or the right half of the region including these pixels.

Still alternatively, the line-buffer writing control section 210 may divide the pixel data into two kinds of data (for example, luminance data and color difference data) in the supplemental image OSD, and allow one or the other thereof to be held. In this case, each time the pixel data is transferred from the frame-rate conversion section 120, the line-buffer writing control section 210 divides the pixel data and allows the buffer to hold either one of the two kinds of data. In addition, in this case, the line-buffer reading control section 230 asserts the read enable signal RE the number of times same as the number of pixels in one line, in response to the write start signal.

Further, the line-buffer writing control section 210 divides the supplemental image into halves, but may divide the same in any other ratio. For example, the line-buffer writing control section 210 may divide the supplemental image at a ratio of 4:6, and allows the buffer to hold 40% of the original supplemental image and 60% of the interpolated supplemental image.

Furthermore, a filter such as a noise removal filter may be provided between the frame-rate conversion section 120 and the line buffer 220. For example, an IIR (Infinite Impulse Response) filter or a FIR (Finite Impulse Response) filter may be provided. In a case of allowing the line data to pass through the filter, the line-buffer writing control section 210 allows the line buffer 220 to hold data obtained by adding the same number of pixels as the number of taps of the filter to the half line.

[Configuration Example of Line-Buffer Writing Control Section]

Figure 6:
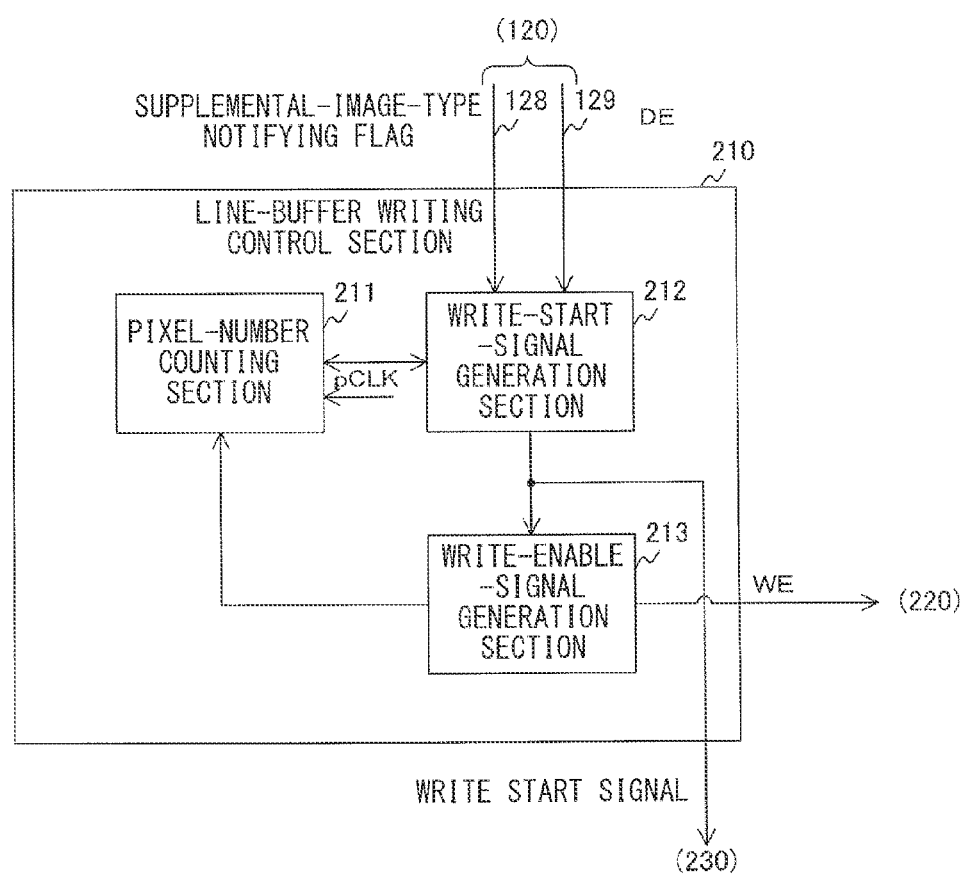
FIG. 6 is a block diagram illustrating a configuration example of a line-buffer writing control section in the first embodiment.

FIG. 6 is a block diagram illustrating a configuration example of the line-buffer writing control section 210 in the first embodiment. The line-buffer writing control section 210 includes a pixel-number counting section 211, a write-start-signal generation section 212, and a write-enable-signal generation section 213.

The pixel-number counting section 211 is provided to count the number of pixels transferred to the memory controller 200 in synchronization with a pixel clock pCLK. The pixel-number counting section 211 sets a count value at an initial value (for example, "0") and starts counting the number of pixels, based on control by the write-start-signal generation section 212. The pixel-number counting section 211 supplies the count value to the write-start-signal generation section 212 and the write-enable-signal generation section 213.

The write-start-signal generation section 212 is provided to generate the write start signal. The write-start-signal generation section 212 acquires the data enable signal DE and the supplemental-image-type notifying flag. The write-start-signal generation section 212 detects a rise in the data enable signal DE, and controls the pixel-number counting section 211 to initialize the count value at the timing of the detection. Further, the write-start-signal generation section 212 determines whether the supplemental image OSD is the original supplemental image or the interpolated supplemental image, based on the supplemental-image-type notifying flag. When the supplemental image OSD is the original supplemental image, the write-start-signal generation section 212 generates the write start signal at the timing of the detection of the rise in the data enable signal DE.

On the other hand, when the supplemental image OSD is the interpolated supplemental image, the write-start-signal generation section 212 refers to the count value of the pixel-number counting section 211, and generates the write start signal at timing of the transfer of the number of pixels equivalent to the half line. The write-start-signal generation section 212 supplies the generated write start signal to the write-enable-signal generation section 213 and the line-buffer reading control section 230.

The write-enable-signal generation section 213 is provided to generate the write enable signal WE. Upon receipt of the write start signal, the write-enable-signal generation section 213 generates the write enable signal WE set at the high level and supplies the generated write enable signal WE to the line buffer 220 during the fixed time T (the time equivalent to the half line), based on the count value of the pixel-number counting section 211.

[Operation Example of Memory Controller]

Figure 7:
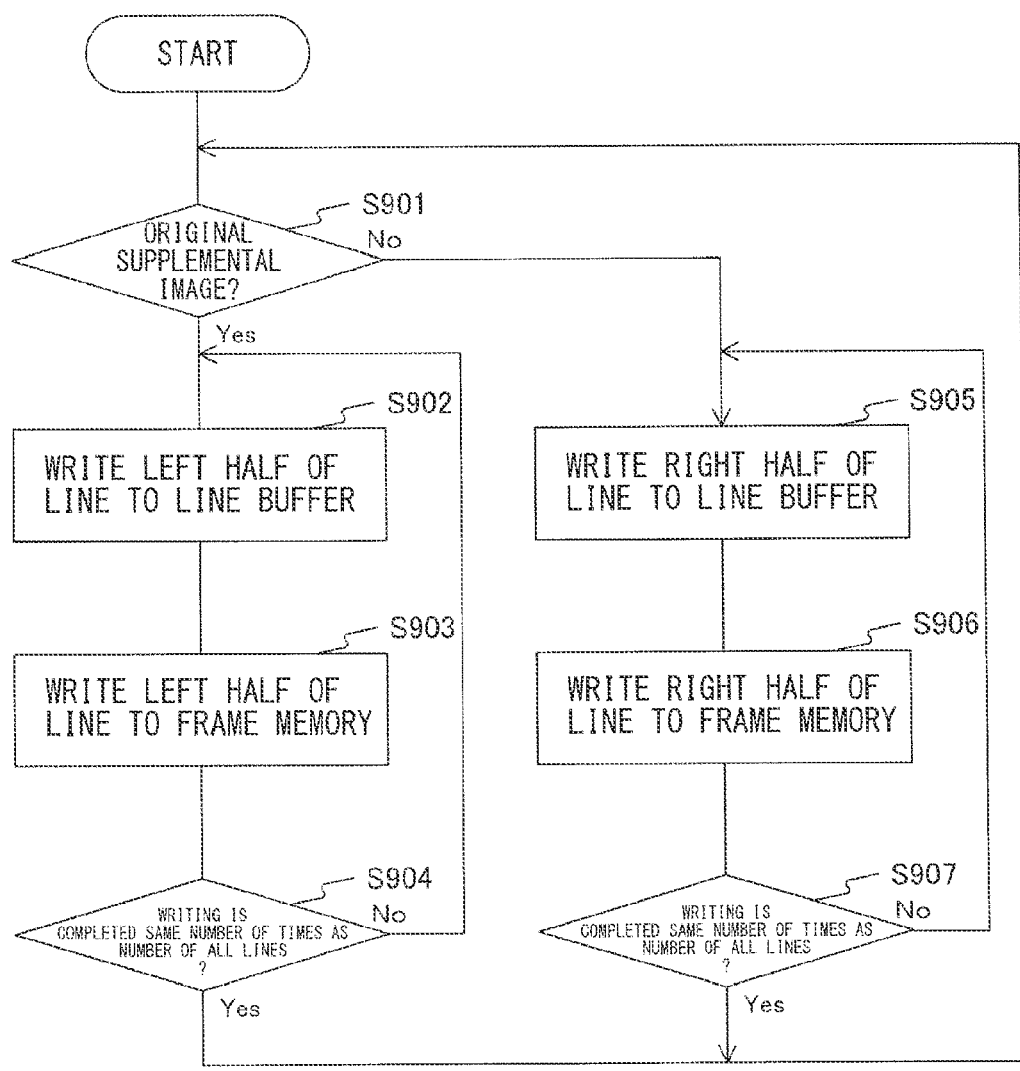
FIG. 7 is a flowchart illustrating an operation example of the memory controller in the first embodiment.

FIG. 7 is a flowchart illustrating an operation example of the memory controller 200 in the first embodiment. This operation may be, for example, started when the moving image including the supplemental image OSD is input into the memory controller 200. In FIG. 7, operation of writing the main image MD in the frame memory 130 is omitted.

The memory controller 200 determines whether or not the inputted supplemental image OSD is the original supplemental image, based on the supplemental-image-type notifying flag (step S901). When the supplemental image OSD is the original supplemental image (step S901: Yes), the memory controller 200 writes the left half of any of the lines in the original supplemental image to the line buffer 220 (step S902). Subsequently, the memory controller 200 writes the data (the left half of the line) held in the line buffer 220, to the frame memory 130 (step S903).

The memory controller 200 determines whether or not the writing is completed the same number of times as the number of all the lines in the original supplemental image (step S904). When the writing is not completed the same number of times as the number of all the lines (step S904: No), the memory controller 200 returns to step S902. On the other hand, when the writing is completed the same number of times as the number of all the lines (step S904: Yes), the memory controller 200 returns to step S901.

When the supplemental image OSD is the interpolated supplemental image (step S901: No), the memory controller 200 writes the right half of any of the lines in the interpolated supplemental image to the line buffer 220 (step S905). Subsequently, the memory controller 200 writes the data (the right half of the line) held in the line buffer 220, to the frame memory 130 (step S906).

The memory controller 200 determines whether or not the writing is completed the same number of times as the number of all the lines in the interpolated supplemental image (step S907). When the writing is not completed the same number of times as the number of all the lines (step S907: No), the memory controller 200 returns to step S905.

On the other hand, when the writing is completed the same number of times as the number of all the lines (step S907: Yes), the memory controller 200 returns to step S901.

Figure 8:
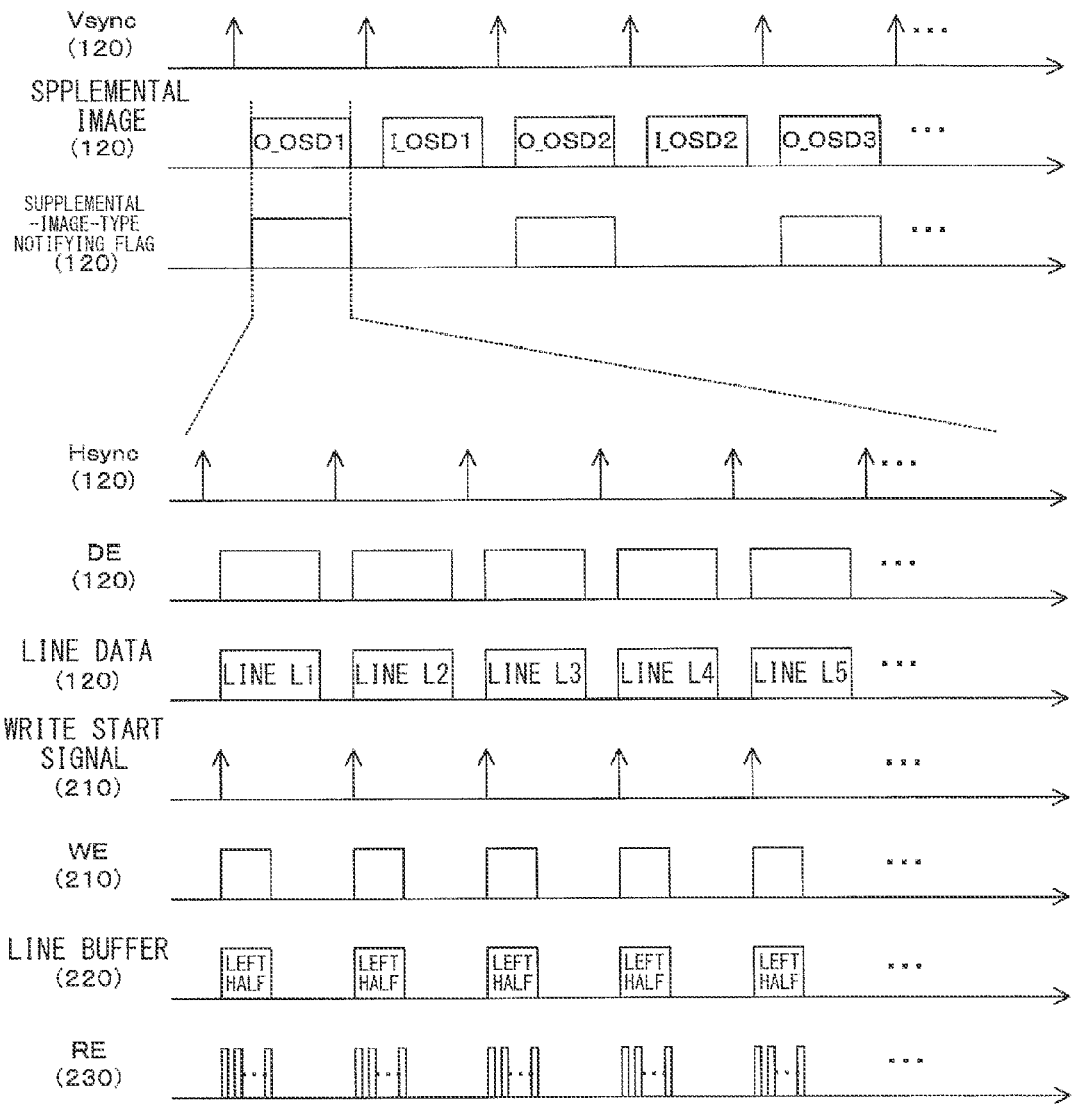
FIG. 8 is a timing chart illustrating an example of operation of writing an original supplemental image by the memory controller, in the first embodiment.

FIG. 8 is a timing chart illustrating an example of operation of writing the original supplemental image by the memory controller 200, in the first embodiment. The frame-rate conversion section 120 transfers each of the supplemental images OSD in synchronization with the vertical synchronizing signal Vsync. In addition, the frame-rate conversion section 120 transfers the supplemental-image-type notifying flag, together with the supplemental image OSD.

For example, together with the original supplemental images O_OSD1, O_OSD2, and O_OSD3, an OSD supplemental-image-type notifying flag having a value of "1" may be transferred. Further, together with the interpolated supplemental image I_OSD1 interpolated between the original supplemental images O_OSD1 and O_OSD2, the OSD supplemental-image-type notifying flag having a value of "0" may be transferred. Together with the interpolated supplemental image I_OSD2 interpolated between the original supplemental images O_OSD2 and O_OSD3, the OSD supplemental-image-type notifying flag having a value of "0" may be transferred.

Each piece of line data in the original supplemental image OSD is transferred to the memory controller 200 in synchronization with the horizontal synchronizing signal Hsync, during the period in which the data enable signal DE is at the high level.

When the original supplemental image is transferred, the line-buffer writing control section 210 in the memory controller 200 determines that the supplemental image OSD is the original supplemental image, based on the supplemental-image-type notifying flag. The line-buffer writing control section 210 generates the write start signal at the timing of a rise in the data enable signal DE. Further, the line-buffer writing control section 210 sets the write enable signal WE at the high level, during a period from the generation of the write start signal up to elapse of the fixed time T (i.e. the time equivalent to the half line). This allows the data of the left half of the line to be written in the line buffer 220.

On the other hand, when the write start signal is generated, the line-buffer reading control section 230 reads the data (the left half of the line) from the line buffer 220 by generating the read enable signal RE. The line-buffer reading control section 230 transfers the data to the frame memory 130. The left half of each line is thus transferred to the frame memory 130. Therefore, the amount of data transfer to the frame memory 130 is half as compared with a case in which the all the lines are transferred. In addition, the amount of data to be written at a time is half as compared with the case in which all the lines are transferred. Therefore, power consumption of the memory controller 200 and the frame memory 130 is reduced.

Figure 9A:
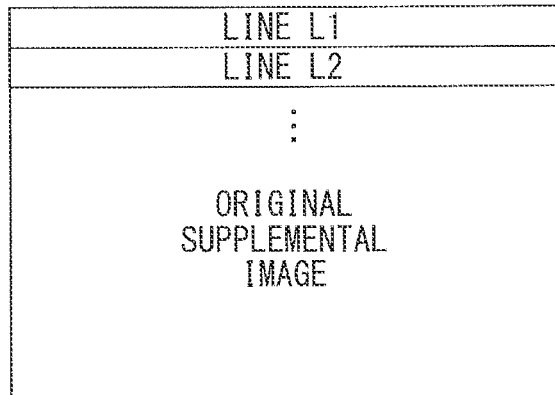
FIGS. 9A to 9C are diagrams illustrating an example related to data held in a line buffer and a frame memory at the time of transfer of the original supplemental image, in the first embodiment.
Figure 9B:
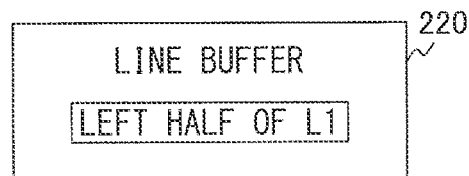
Figure 9C:
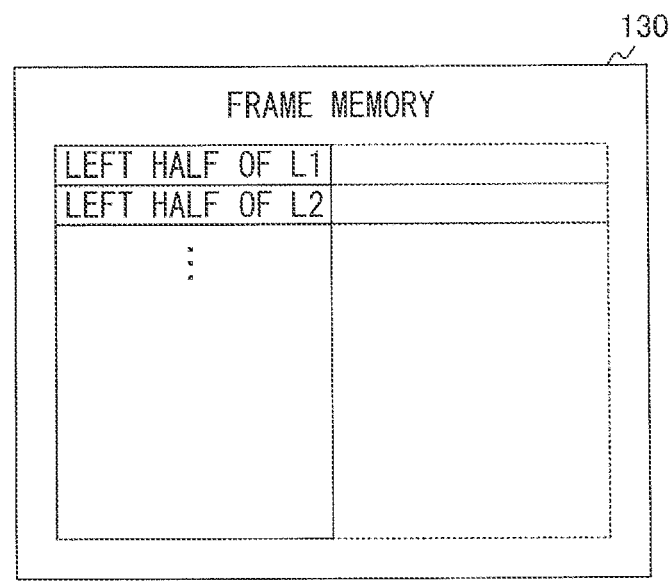

FIGS. 9A to 9C are diagrams illustrating an example related to the data held in the line buffer 220 and the frame memory 130 at the time of the transfer of the original supplemental image, in the first embodiment. FIG. 9A is an example of the original supplemental image. The original supplemental image includes a plurality of lines such as lines L1 and L2, and these lines are transferred to the memory controller 200 sequentially in synchronization with the horizontal synchronizing signal Hsync.

FIG. 9B is a diagram illustrating an example of the data held in the line buffer 220. When the line L1 in the original supplemental image is transferred to the memory controller 200, the memory controller 200 allows the left half of the line L1 to be held in the line buffer 220. For each of the lines except the line L1, the left half is similarly held.

FIG. 9C is a diagram illustrating an example of the data held in the frame memory 130. The memory controller 200 transfers and writes the left half of each of the lines held in the line buffer 220, to the frame memory 130. The left half of the original supplemental image is thereby written in the frame memory 130. The original main image MD is also written in the frame memory 130, although illustration of the original main image MD is omitted in FIG. 9C.

Figure 10:
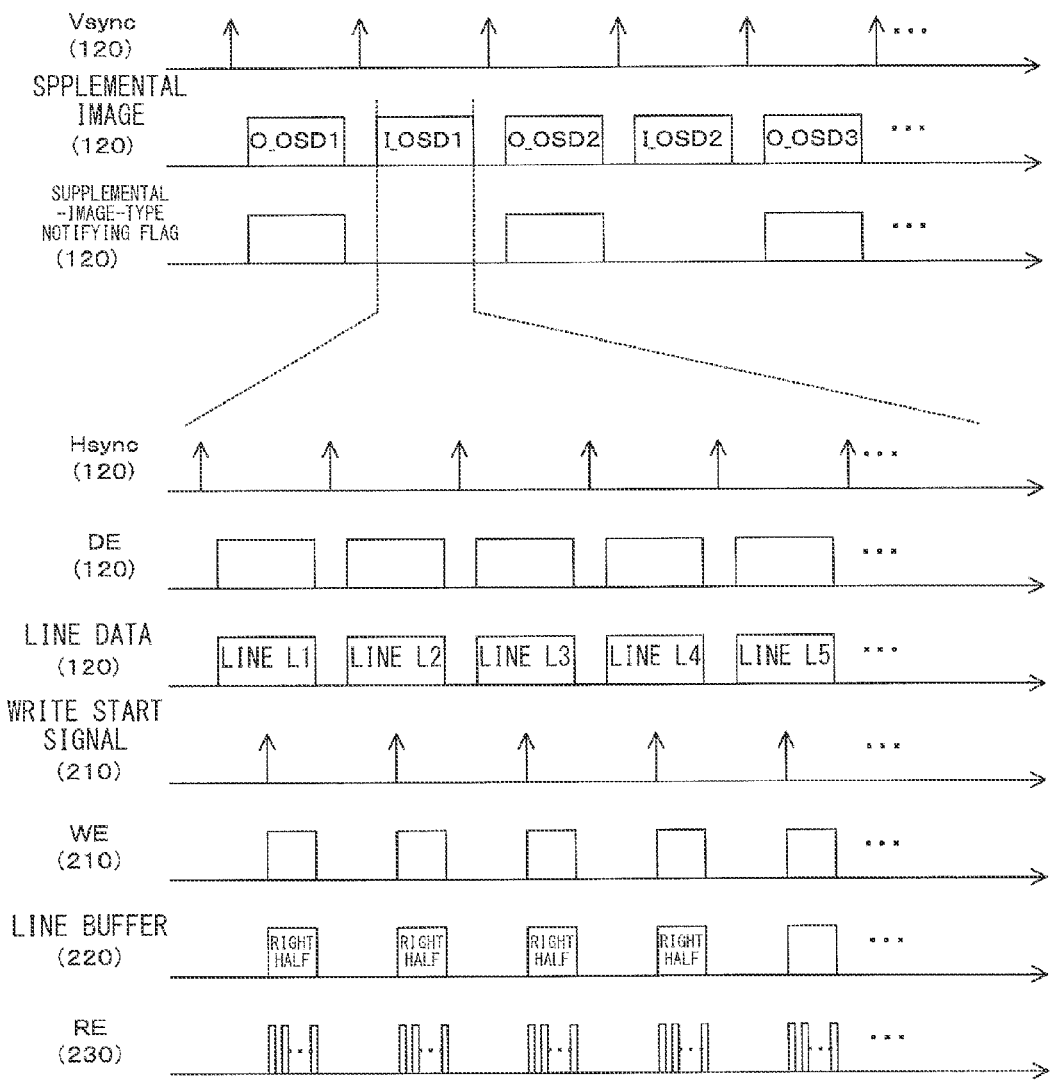
FIG. 10 is a timing chart illustrating an example of operation of writing an interpolated supplemental image by the memory controller, in the first embodiment.

FIG. 10 is a timing chart illustrating an example of operation of writing the interpolated supplemental image by the memory controller 200, in the first embodiment.

Each piece of line data in the interpolated supplemental image OSD is transferred to the memory controller 200 in synchronization with the horizontal synchronizing signal Hsync, during the period in which the data enable signal DE is at the high level.

When the interpolated supplemental image is transferred, the line-buffer writing control section 210 in the memory controller 200 determines that the supplemental image OSD is the interpolated supplemental image, based on the supplemental-image-type notifying flag. The line-buffer writing control section 210 generates the write start signal after a lapse of the fixed time T (i.e. the time equivalent to the half line) from a rise in the data enable signal DE. In addition, the line-buffer writing control section 210 sets the write enable signal WE at the high level, during a period from the generation of the write start signal up to elapse of the fixed time T. The data of the right half of the line is thereby written in the line buffer 220.

On the other hand, when the write start signal is generated, the line-buffer reading control section 230 reads the data (the right half of the line) from the line buffer 220, by generating the read enable signal RE. The line-buffer reading control section 230 transfers the data to the frame memory 130. The right half of each line is thus transferred to the frame memory 130. Therefore, the amount of data transfer to the frame memory 130 is half as compared with the case in which all the lines are transferred. In addition, the amount of data to be written at a time is half as compared with the case in which all the lines are transferred. Therefore, power consumption of the memory controller 200 and the frame memory 130 is reduced.

Figure 11A:
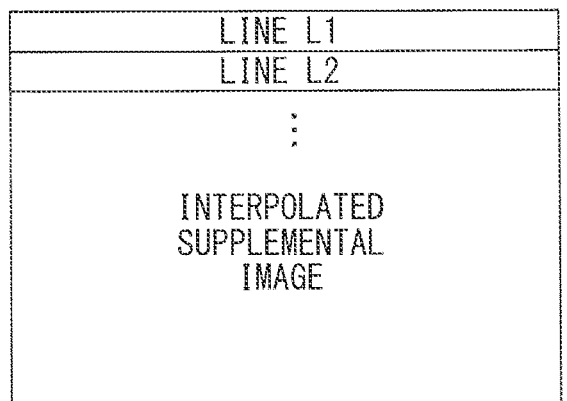
FIGS. 11A to 11C are diagrams illustrating an example related to data held in the line buffer and the frame memory at the time of transfer of the interpolated supplemental image, in the first embodiment.
Figure 11B:
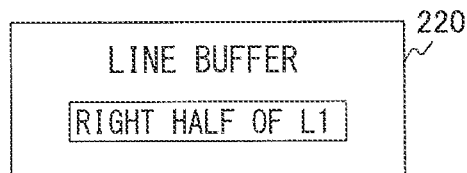
Figure 11C:
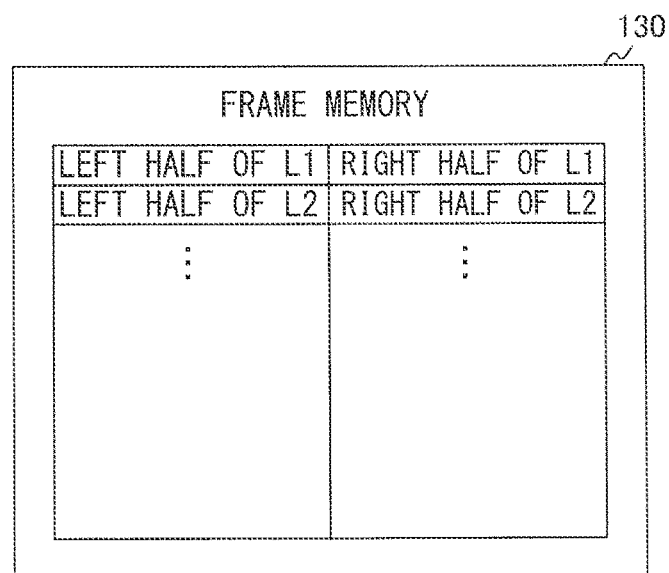

FIGS. 11A to 11C are diagrams illustrating an example related to the data held in the line buffer 220 and the frame memory 130 at the time of the transfer of the interpolated supplemental image, in the first embodiment. FIG. 11A is an example of the interpolated supplemental image. Each of the lines in the interpolated supplemental image is transferred to the memory controller 200 sequentially in synchronization with the horizontal synchronizing signal Hsync.

FIG. 11B is a diagram illustrating an example of the data held in the line buffer 220. When the line L1 in the interpolated supplemental image is transferred to the memory controller 200, the memory controller 200 allows the right half of the line L1 to be held in the line buffer 220. For each of the lines except the line L1, the right half is similarly held.

FIG. 11C is a diagram illustrating an example of the data held in the frame memory 130. The memory controller 200 transfers and writes the right half of each of the lines held in the line buffer 220, to the frame memory 130. The right half of the original supplemental image is thereby written in the frame memory 130. The interpolated supplemental image is an image identical to the original supplemental image, and therefore an image including the left half of the original supplemental image and the right half of the interpolated supplemental image is an image identical to the original image or the interpolated supplemental image. The interpolated main image MD is also written in the frame memory 130, although illustration of the interpolated main image MD is omitted in FIG. 11C.

In this way, according to the first embodiment of the present technology, the image processing device 100 transfers the left half of the original supplemental image and the right half of the interpolated supplemental image to the frame memory 130 to be held therein. Therefore, it is possible to reduce the amount of data transfer per unit time to the frame memory 130. This allows room for a data transfer rate (i.e. a band) of transfer to the frame memory 130, making it possible to increase the frame rate and an image resolution.

[First Modification]

Figure 12:
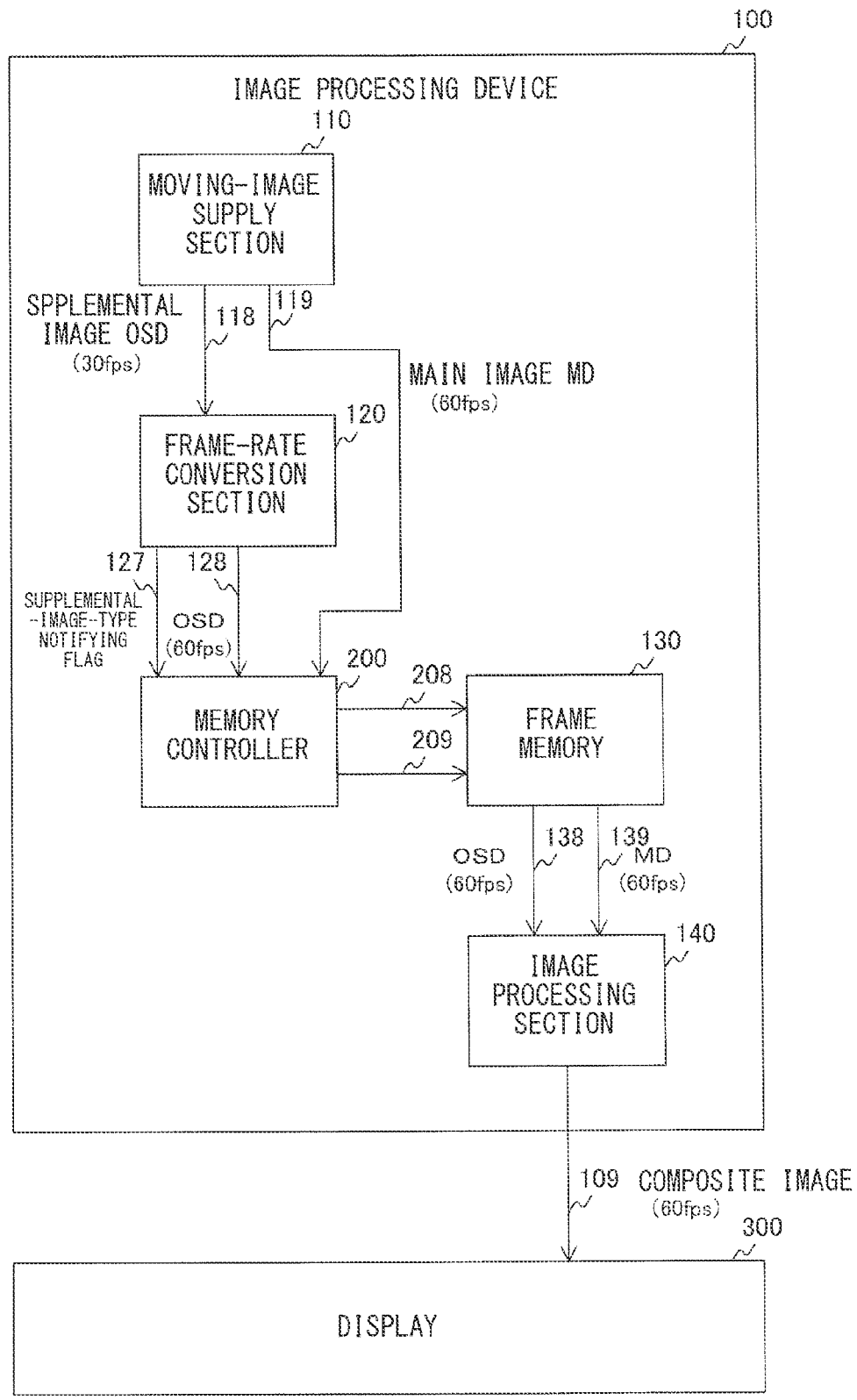
FIG. 12 is a block diagram illustrating a configuration example of an image processing system in a first modification of the first embodiment.

FIG. 12 is a block diagram illustrating a configuration example of an image processing system in a first modification of the first embodiment. In the first embodiment, the frame-rate conversion section 120 performs the frame rate conversion of the moving image including the main image MD. However, when the frame rate of this moving image is higher than that of the supplemental image OSD before the conversion, and therefore the conversion is not necessary, the frame rate conversion of this moving image may be omitted. The frame-rate conversion section 120 of the first modification is different from that of the first embodiment, in that the frame rate conversion of only the moving image including the supplemental image OSD is performed.

The moving-image supply section 110 of the first modification directly supplies the moving image including the main image MD to the memory controller 200, without going through the frame-rate conversion section 120. The frame rate of this moving image may be, for example, 60 fps.

[Second Modification]

Figure 13:
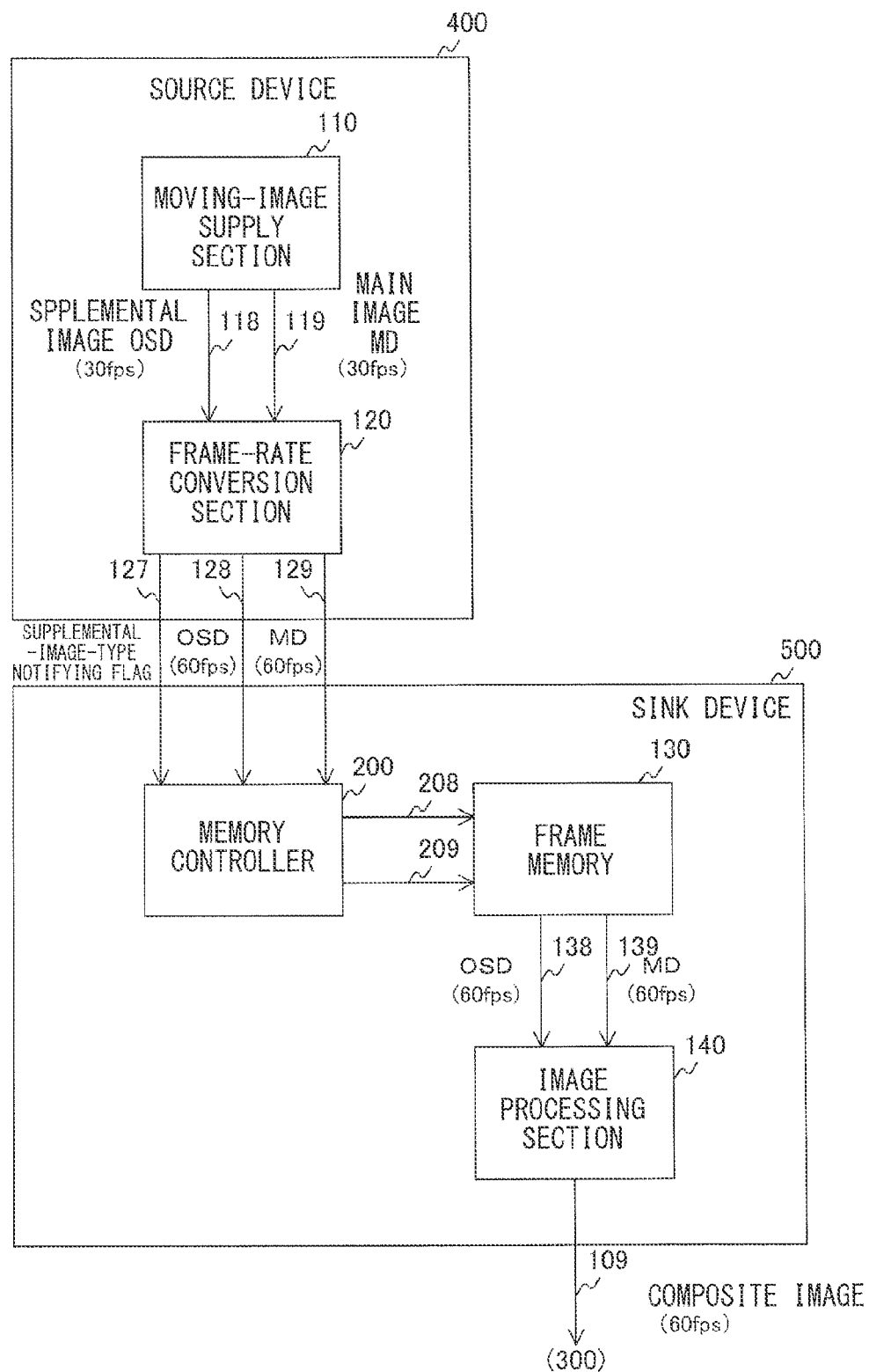
FIG. 13 is a block diagram illustrating a configuration example of an image processing system in a second modification of the first embodiment.

FIG. 13 is a block diagram illustrating a configuration example of an image processing system in a second modification of the first embodiment. In the first embodiment, the image processing device 100 includes the moving-image supply section 110, the frame-rate conversion section 120, the memory controller 200, the frame memory 130, and the image processing section 140. However, these may be provided dispersedly in a plurality of devices. The image processing system of the second modification is different from that of the first embodiment, in that a source device 400 and a sink device 500 are provided in place of the image processing device 100.

The source device 400 includes the moving-image supply section 110 and the frame-rate conversion section 120. The sink device 500 includes the memory controller 200, the frame memory 130, and the image processing section 140.

It is to be noted that the source device 400 includes the frame-rate conversion section 120, but the sink device 500 instead of the source device 400 may include the frame-rate conversion section 120.

2. Second Embodiment

In the first embodiment, the image processing device 100 performs the double-speed conversion. However, conversion other than the double-speed conversion may be performed, as long as the frame rate is converted to a frame rate higher than that before the conversion. For example, 24 fps may be converted to 60 fps. Such conversion is called 2-3 pull down or telecine conversion. An image processing device 100 of a second embodiment is different from that of the first embodiment, in that the 2-3 pull down is performed.

Figure 14A:
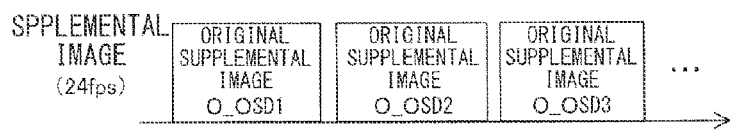
FIGS. 14A and 14B are diagrams illustrating an example of a moving image before frame rate conversion and an example of a moving image after the frame rate conversion, respectively, in the second embodiment.
Figure 14B:
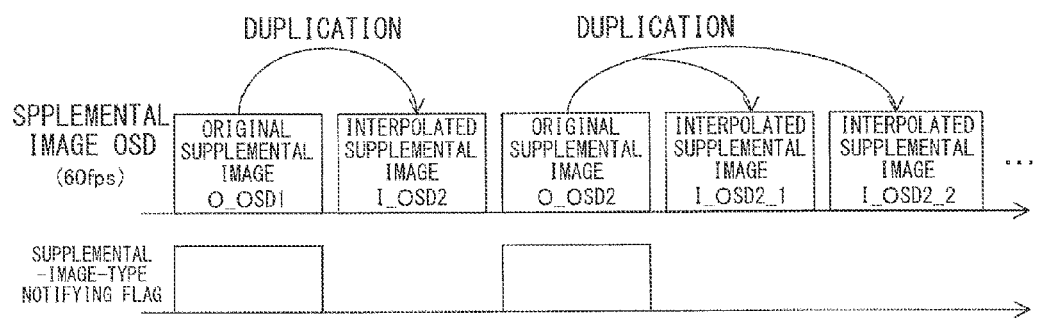

FIGS. 14A and 14B are diagrams illustrating an example of a moving image before the frame rate conversion and an example of a moving image after the frame rate conversion, respectively, in the second embodiment. FIG. 14A is a diagram illustrating an example of the moving image including the supplemental image OSD before the frame rate conversion. This moving image includes the plurality of supplemental images OSD such as the original supplemental images O_OSD1, O_OSD2, and O_OSD3, in time-series order.

FIG. 14B is a diagram illustrating an example of each of the moving image including the supplemental image OSD after the frame rate conversion and the supplemental-image-type notifying flag. In the 2-3 pull down, for example, one interpolated supplemental image may be generated from an odd-numbered supplemental image, and two interpolated supplemental images may be generated from even-numbered supplemental image. For example, an image obtained by duplicating the original supplemental image O_OSD1 may be interpolated between the original supplemental image O_OSD1 and the original supplemental image O_OSD2, as the interpolated supplemental image I_OSD1. Further, two images obtained by duplicating the original supplemental image O_OSD2 may be interpolated between the original supplemental image O_OSD2 and the original supplemental image O_OSD3, as the interpolated supplemental images I_OSD2_1 and I_OSD_2.

[Configuration Example of Memory Controller]

Figure 15:
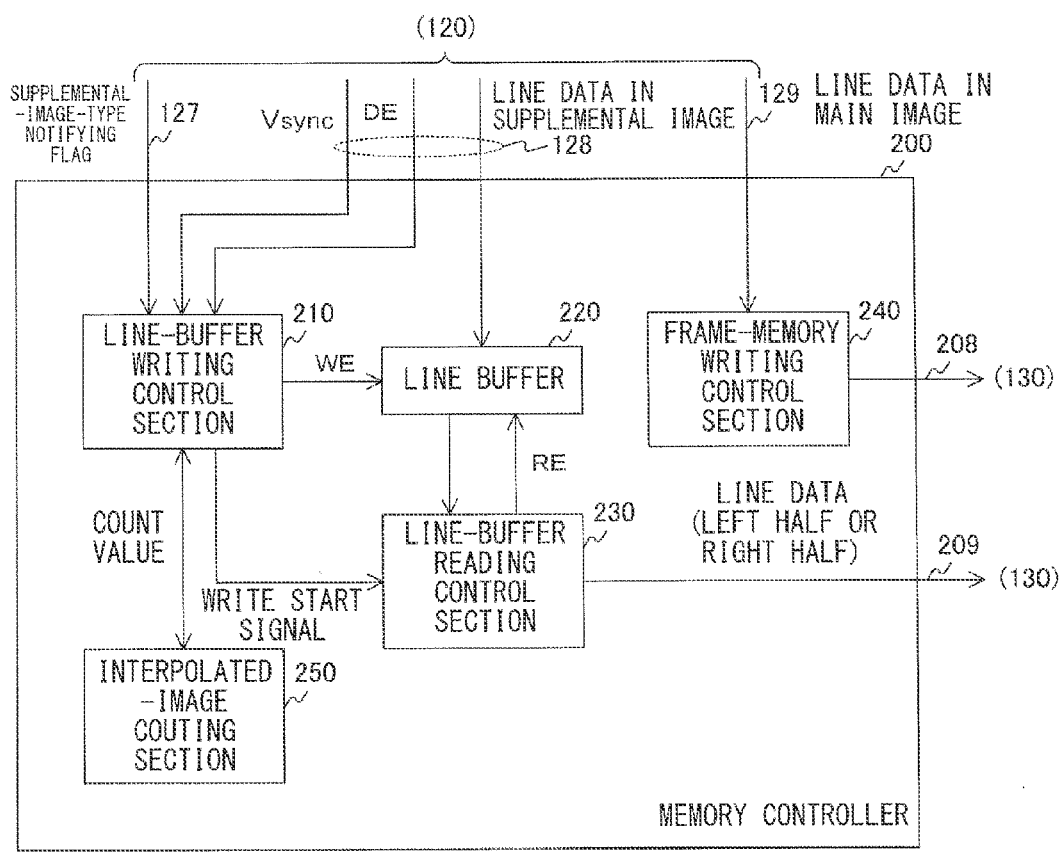
FIG. 15 is a block diagram illustrating a configuration example of a memory controller in the second embodiment.

FIG. 15 is a block diagram illustrating a configuration example of a memory controller 200 in the second embodiment. The memory controller 200 of the second embodiment is different from that of the first embodiment, in that an interpolated-image counting section 250 is further provided.

The interpolated-image counting section 250 counts the number of successive interpolated supplemental images, based on control by the line-buffer writing control section 210. The interpolated-image counting section 250 supplies a count value of the interpolated supplemental image to the line-buffer writing control section 210.

When the supplemental-image-type notifying flag is at the low level (i.e. the interpolated supplemental image is transferred), the line-buffer writing control section 210 of the second embodiment increments the count value in synchronization with the vertical synchronizing signal Vsync, by controlling the interpolated-image counting section 250. Further, when the supplemental-image-type notifying flag is at the high level (i.e. the original supplemental image is transferred), the line-buffer writing control section 210 sets the count value at the initial value (for example, "0"). Furthermore, when the count value is a value (for example, "2") corresponding to the second interpolated supplemental image, the line-buffer writing control section 210 sets the write enable signal WE at the low level, without generating the write start signal. As a result, of the two successive interpolated supplemental images, the second interpolated supplemental image is not written in the frame memory 130. This is because the whole one image is held in the frame memory 130, at the time when the right half of the first interpolated supplemental image is transferred.

The image processing section 140 of the second embodiment performs processing by reading the odd-numbered image held in the frame memory 130 twice, and reading the even-numbered image held in the same three times.

Figure 16:
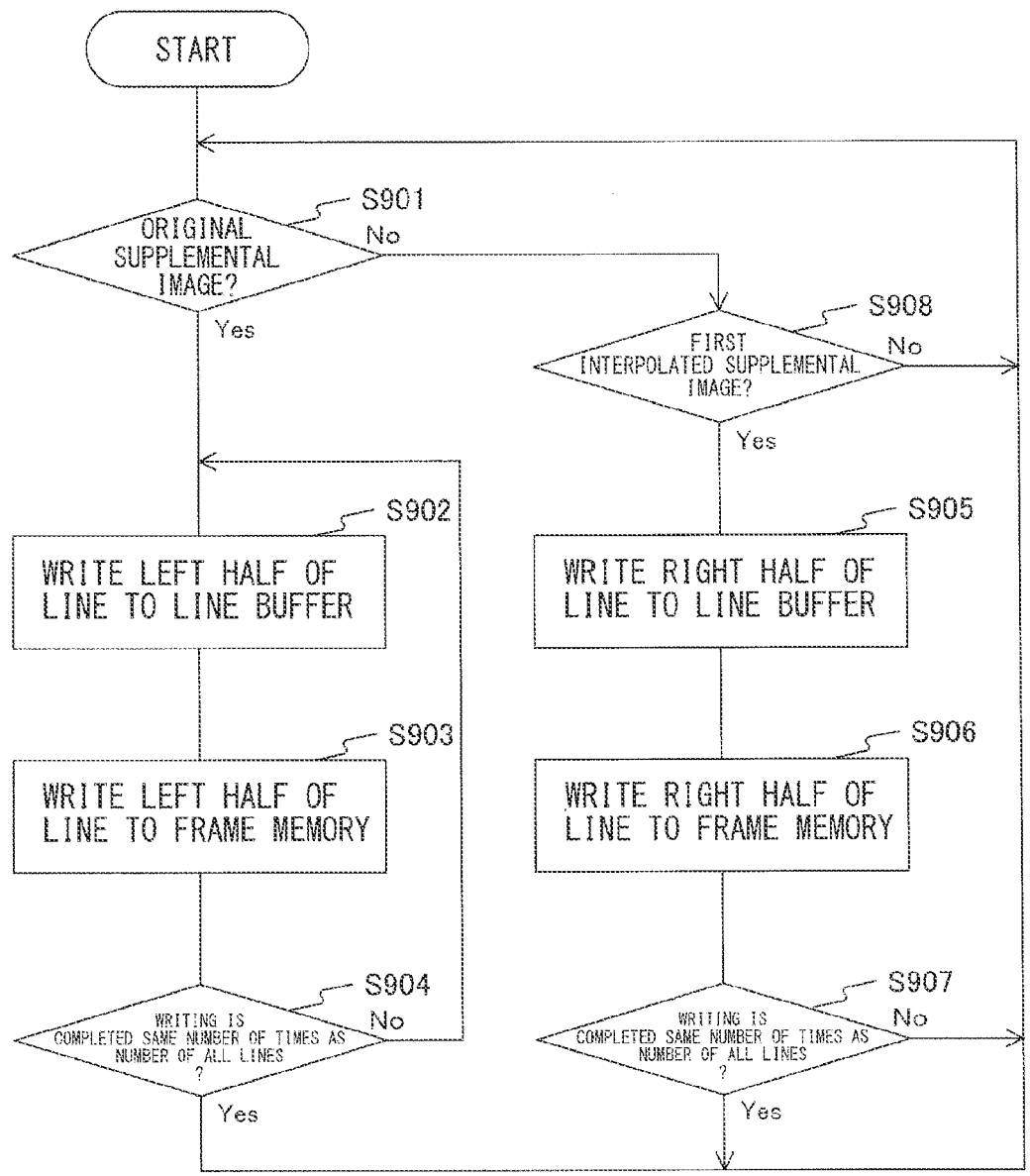
FIG. 16 is a flowchart illustrating an example of operation of the memory controller in the second embodiment.

FIG. 16 is a flowchart illustrating an example of the operation of the memory controller 200 in the second embodiment. The operation of the memory controller 200 of the second embodiment is different from that of the first embodiment, in that the memory controller 200 further performs step S908.

When the supplemental image OSD is the interpolated supplemental image (step S901: No), the memory controller 200 determine whether or not the interpolated supplemental image is the first interpolated supplemental image (step S908). When the interpolated supplemental image is the first interpolated supplemental image (step S908: Yes), the memory controller 200 performs steps S905, S906, and S907. On the other hand, when the interpolated supplemental image is the second interpolated supplemental image (step S908: No), the memory controller 200 returns to step S901.

Figure 17:
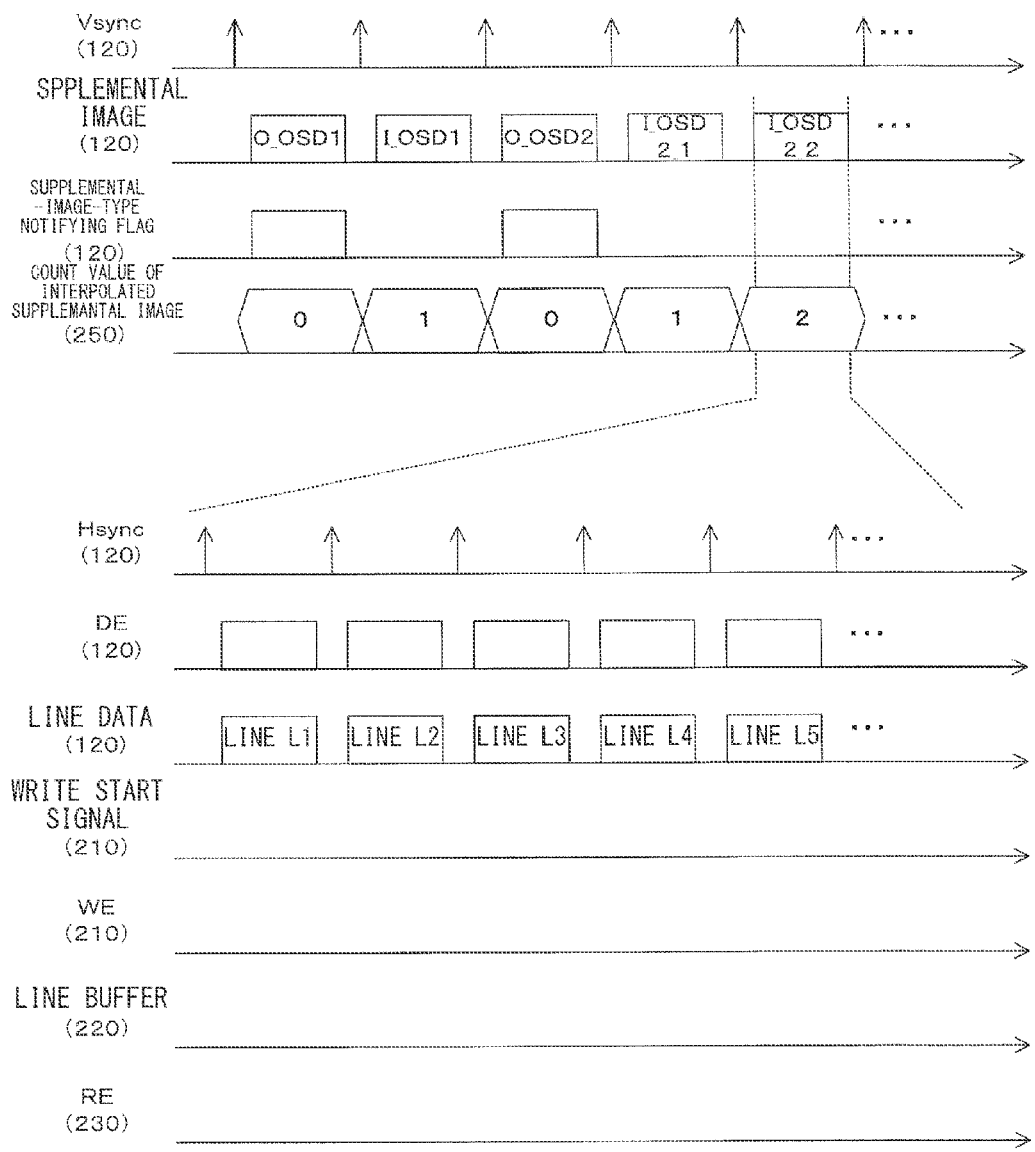
FIG. 17 is a timing chart illustrating an example of operation of writing an interpolated supplemental image by the memory controller in the second embodiment.

FIG. 17 is a timing chart illustrating an example of the operation of writing the interpolated supplemental image by the memory controller, in the second embodiment. When the original supplemental image O_OSD1 or O_OSD2 is transferred from the frame-rate conversion section 120, the interpolated-image counting section 250 in the memory controller 200 sets the count value at the initial value (for example, "0"). When the interpolated supplemental image I_OSD1, I_OSD2_1 or I_OSD2_2 is transferred, the interpolated-image counting section 250 increments the count value. The interpolated supplemental images I_OSD2_1 and I_OSD2_2 are transferred successively, and therefore the count value becomes "2" when the interpolated supplemental image I_OSD2_2 is transferred.

When the count value is "2", the line-buffer writing control section 210 sets the write enable signal WE at the low level, without generating the write start signal. Because the write start signal is not generated, the line-buffer reading control section 230 sets the read enable signal RE at the low level. Therefore, the second interpolated supplemental image is not transferred to the frame memory 130.

It is to be noted that, when interpolating a plurality of successive interpolated supplemental images, the memory controller 200 may transfer a half of the second or subsequent interpolated supplemental images, without transferring the first interpolated supplemental image. For example, when the frame-rate conversion section 120 performs the quad-speed conversion instead of performing the 2-3 pull down, three interpolated supplemental images may be interpolated between the original supplemental images next to each other. In this case, the memory controller 200 may transfer the right half of the second or third image of these three images, to the frame memory 130.

Further, the interpolated supplemental images is counted by the memory controller 200, but may be counted by the frame-rate conversion section 120. In this case, the frame-rate conversion section 120 further generates the count value or a flag indicating whether or not the image is the first interpolated supplemental image, and supplies the memory controller 200 with the generated count value or the generated flag. Based on the count value or the flag, the memory controller 200 determines whether or not the image is the first interpolated supplemental image.

In this way, according to the second embodiment of the present technology, the memory controller 200 transfers the right half of only the first interpolated supplemental image of the two successive interpolated supplemental images, to the frame memory 130. Therefore, it is possible to further reduce the amount of data transfer.

It is to be noted that each of the above-described embodiments is an example for embodying the present technology, and the elements in each of the above-described embodiments correspond to elements in one embodiment of the present technology. Similarly, elements in one embodiment of the present technology correspond to the elements provided with the same designations as those thereof in each of the above-described embodiments. However, the present technology is not limited to the above-described embodiments, and may be embodied by variously modifying each of the above-described embodiments in the scope not deviating from the gist thereof.

In addition, a series of procedures described in each of the above-described embodiments may be interpreted as a method of having the series of procedures, or may be interpreted as a program allowing a computer to execute the series of procedures, or as a recording medium storing such a program. Usable examples of this recording medium may include CD (Compact Disc), MD (MiniDisc), DVD (Digital Versatile Disc), memory card, and Blu-ray Disc (registered trademark).

Furthermore, the technology encompasses any possible combination of some or all of the various embodiments described herein and incorporated herein.

It is possible to achieve at least the following configurations from the above-described example embodiments of the disclosure.

(1) An image processing device including:

a control section configured to allow, upon receipt of a moving image that includes, in time-series order, an original image and a duplicate image, a frame memory to hold a partial region in the original image and a remaining region in the duplicate image, the duplicate image being a duplicate of the original image, and the remaining region being a region excluding a region that agrees with the partial region; and an image processing section configured to read a piece of data that includes the partial region and the remaining region from the frame memory a plurality of times, and perform image processing by processing any of the read pieces of data as the original image and the remaining piece of data as the duplicate image.

(2) The image processing device according to (1), wherein the moving image includes a plurality of the duplicate images that are successive in the time-series order, and the control section allows the frame memory to hold the remaining region in any of the plurality of successive duplicate images.

(3) The image processing device according to (1) or (2), wherein each of the original image and the duplicate image is an image including a plurality of pieces of transfer-unit data, and the control section includes:

a buffer configured to hold data;

a writing control section configured to divide, each time the writing control section receives any of the pieces of transfer-unit data in the original image, the received piece of transfer-unit data into two pieces of divisional data, and allow the buffer to hold one of the two pieces of divisional data, and configured to divide, each time the writing control section receives any of the pieces of transfer-unit data in the duplicate image, the received piece of transfer-unit data into the two pieces of divisional data, and allow the buffer to hold the other of the two pieces of divisional data; and a reading control section configured to read, each time either of the two pieces of divisional data is held in the buffer, the held piece of divisional data, and allow the frame memory to hold the read piece of divisional data.

(4) The image processing device according to (3), wherein each of the pieces of transfer-unit data is line data that includes pixels arranged in a line in a predetermined direction.

(5) The image processing device according to (3), wherein each of the pieces of transfer-unit data is pixel data.

(6) The image processing device according to any one of (3) to (5), wherein each of the two pieces of divisional data has a data size that is equal to or less than a burst access size of the frame memory.

(7) The image processing device according to any one of (1) to (6), further including a duplication section configured to generate the duplicate image from the original image, and supply the original image and the duplicate image to the control section in the time-series order.

(8) The image processing device according to (7), wherein the duplication section generates a flag indicating whether or not an image in the moving image is the original image, and supplies the generated flag together with the original image and the duplicate image to the control section, and the control section determines whether or not the image in the moving image is the original image, based on the supplied flag.

(9) The image processing device according to any one of (1) to (8), wherein each of the original image and the duplicate image is a supplemental image to be combined with a main image, and the image processing includes processing of combining each of the original image and the duplicate image with the main image.

(10) An image processing method including:

allowing, upon receipt of a moving image that includes, in time-series order, an original image and a duplicate image, by a control section a frame memory to hold a partial region in the original image and a remaining region in the duplicate image, the duplicate image being a duplicate of the original image, and the remaining region being a region excluding a region that agrees with the partial region; and reading, by an image processing section, a piece of data that includes the partial region and the remaining region from the frame memory a plurality of times, and performing, by the image processing section, image processing by processing any of the read pieces of data as the original image and the remaining piece of data as the duplicate image.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing device comprising:
   a control section configured to allow, upon receipt of a moving image that includes, in time-series order, an original image and a duplicate image, a frame memory to hold a partial region in the original image and a remaining region in the duplicate image, the duplicate image being a duplicate of the original image, and the remaining region being a region excluding a region that agrees with the partial region; and
   an image processing section configured to read a piece of data that includes the partial region and the remaining region from the frame memory a plurality of times, and perform image processing by processing any of the read pieces of data as the original image and the remaining piece of data as the duplicate image.

2. The image processing device according to claim 1, wherein
   the moving image includes a plurality of the duplicate images that are successive in the time-series order, and
   the control section allows the frame memory to hold the remaining region in any of the plurality of successive duplicate images.

3. The image processing device according to claim 1, wherein
   each of the original image and the duplicate image is an image including a plurality of pieces of transfer-unit data, and
   the control section includes:
   a buffer configured to hold data;
   a writing control section configured to divide, each time the writing control section receives any of the pieces of transfer-unit data in the original image, the received piece of transfer-unit data into two pieces of divisional data, and allow the buffer to hold one of the two pieces of divisional data, and configured to divide, each time the writing control section receives any of the pieces of transfer-unit data in the duplicate image, the received piece of transfer-unit data into the two pieces of divisional data, and allow the buffer to hold the other of the two pieces of divisional data; and
   a reading control section configured to read, each time either of the two pieces of divisional data is held in the buffer, the held piece of divisional data, and allow the frame memory to hold the read piece of divisional data.

4. The image processing device according to claim 3, wherein each of the pieces of transfer-unit data is line data that includes pixels arranged in a line in a predetermined direction.

5. The image processing device according to claim 3, wherein each of the pieces of transfer-unit data is pixel data.

6. The image processing device according to claim 3, wherein each of the two pieces of divisional data has a data size that is equal to or less than a burst access size of the frame memory.

7. The image processing device according to claim 1, further comprising a duplication section configured to generate the duplicate image from the original image, and supply the original image and the duplicate image to the control section in the time-series order.

8. The image processing device according to claim 7, wherein
   the duplication section generates a flag indicating whether or not an image in the moving image is the original image, and supplies the generated flag together with the original image and the duplicate image to the control section, and
   the control section determines whether or not the image in the moving image is the original image, based on the supplied flag.

9. The image processing device according to claim 1, wherein
   each of the original image and the duplicate image is a supplemental image to be combined with a main image, and
   the image processing includes processing of combining each of the original image and the duplicate image with the main image.

10. An image processing method comprising:
    allowing, upon receipt of a moving image that includes, in time-series order, an original image and a duplicate image, by a control section a frame memory to hold a partial region in the original image and a remaining region in the duplicate image, the duplicate image being a duplicate of the original image, and the remaining region being a region excluding a region that agrees with the partial region; and
    reading, by an image processing section, a piece of data that includes the partial region and the remaining region from the frame memory a plurality of times, and performing, by the image processing section, image processing by processing any of the read pieces of data as the original image and the remaining piece of data as the duplicate image.

* * * * *